(12) United States Patent
Matsumoto et al.

(10) Patent No.: US 8,882,186 B2
(45) Date of Patent: Nov. 11, 2014

(54) SEAL STRUCTURE FOR DOOR OF AUTOMOBILE

(71) Applicants: Nishikawa Rubber Co., Ltd., Hiroshima (JP); Honda Motor Co., Ltd., Tokyo (JP)

(72) Inventors: Michihiko Matsumoto, Hiroshima (JP); Eiichi Baba, Hiroshima (JP); Kenichi Kitayama, Shimotsuke (JP)

(73) Assignee: Nishikawa Rubber Co., Ltd, Hiroshima-shi, Hiroshima-ken (JP)

( * ) Notice: Subject to any disclaimer, the term of this patent is extended or adjusted under 35 U.S.C. 154(b) by 0 days.

(21) Appl. No.: 13/867,323

(22) Filed: Apr. 22, 2013

(65) Prior Publication Data

US 2013/0285409 A1    Oct. 31, 2013

(30) Foreign Application Priority Data

Apr. 27, 2012  (JP) ................................. 2012-103866
Apr. 27, 2012  (JP) ................................. 2012-103872

(51) Int. Cl.
*B60J 10/08*  (2006.01)
*B60J 10/12*  (2006.01)
*B60J 10/00*  (2006.01)

(52) U.S. Cl.
CPC ................ *B60J 10/081* (2013.01); *B60J 10/12* (2013.01); *B60J 10/0062* (2013.01); *B60J 10/0031* (2013.01); *B60J 10/085* (2013.01)
USPC .................... 296/216.02; 49/475.1; 49/495.1; 296/146.9

(58) Field of Classification Search
CPC ....................................................... B60J 10/081
USPC .............. 296/216.02, 146.9; 49/475.1, 498.1, 49/489.1, 495.1
See application file for complete search history.

(56) References Cited

U.S. PATENT DOCUMENTS 4,729,596 A  *  3/1988  Fujihara et al. ................ 296/218
2009/0100761 A1 *  4/2009  Hashimoto et al. .......... 49/475.1

FOREIGN PATENT DOCUMENTS

JP    62-091316 A    4/1987
JP    63-176721 A    7/1988

* cited by examiner

*Primary Examiner* — Dennis H Pedder
*Assistant Examiner* — Beverly Becker
(74) *Attorney, Agent, or Firm* — Lucas & Mercanti LLP; Robert P. Michal

(57) ABSTRACT

A tangent 140 on a contact part 80 on which a hollow seal member 32 of a weather strip 30 mounted on a side door 21 first touches a roof door 23 is a straight line which divides an angle θ2 on an acute angle side between an advancing locus 110 of the side door 21 and an advancing locus 120 of a roof door 23 into a substantially half angle θ1, the two advancing loci intersecting on the contact part 80.

20 Claims, 16 Drawing Sheets

SEAL STRUCTURE FOR DOOR OF AUTOMOBILE

This application claims the benefit under 35 USC 119 of JP Patent Applications JP 2012-103866 filed Apr. 27, 2012 and JP 2012-103872 filed Apr. 27, 2012, the entire disclosure of each of which is incorporated herein by reference.

BACKGROUND OF THE INVENTION

The present invention relates to seal structures for doors of automobiles in which door openings for side doors have roof openings for roof doors successively provided on upper sides thereof. Side ends of the roof doors open and close in upward and downward directions.

Brides' taxis or bridal taxis for preventing Japanese brides' headdress from bumping against ceilings have been well known, in which the door openings for side doors for rear side seats have the roof openings for roof doors successively provided on upper sides thereof via hinge mechanisms provided on center sides of automobiles. The side ends of the roof doors (roof hatch) open and close in upward and downward directions for enlarging openings for getting on and getting out.

Also, some automobiles have enlarged openings for getting on and getting out on front side seats as well as rear side seats for facilitating getting on and getting out (see, for example, the Japanese unexamined Patent Publication Nos. S62-91316 and S63-176721).

The brides' taxis (bridal taxis) or the automobiles as disclosed in S62-91316 have the side doors with sashes, in which the side doors are opened first and the roof doors are opened second manually or automatically. In general, the roof doors can not be opened while the side doors are closed.

It is because opening and closing mechanisms between the side doors and the roof doors are subject to restrictions concerning orders of opening and closing without fail in consideration of construction of seal parts formed on the weather strips provided on peripheral edges of side doors.

In addition, there have not been proposed the seal structures for doors of automobiles capable of prior closing or posterior closing of either of the doors, the roof doors for example, while sufficiently securing sealing property between the side doors and the roof doors.

As to sedan cars shown in FIG. 15, for example, of which side door 1 with a door sash 2 opens and closes in right and left directions (widthwise direction of the automobile), shape in cross section of a seal part of a weather strip 10 mounted on the door sash 2, that is the shape in cross section of a hollow seal member 12 and a seal lip 13 of the weather strip 10 which makes elastic contact with a body panel 3 when the side door 1 is closed, has been determined in consideration of advancing locus 110 of the side door 1. In case of the automobiles of which roof doors open, advancing locus 120 (see FIG. 17) of the roof doors also have to be considered.

More specifically, as shown in FIG. 16, a position and a shape in cross section of the hollow seal member 12 integrally molded with an inner-cabin side of the installation base member 11 of the weather strip 10 is determined in a manner to make elastic contact with a convex 3a formed on an inner-cabin side surface of the body panel 3 when the side door 1 is closed. Also, a position and a shape in cross section of a seal lip 13 having a substantially tongue shape in cross-section, which is integrally molded with an outer-cabin side of the installation base member 11 is determined in a manner that a back side surface (surface on the body panel 3 side) of the seal lip 13 makes elastic contact with the outer-cabin side surface of the body panel 3 and a top end of the seal lip 13 curves toward the outer-cabin side.

Suppose that the body panel 3 shown in FIG. 15 opens and closes in the upward and downward directions like the roof door and makes elastic contact with the weather strip 10 mounted on the side door 1 as closed from an upper side, the convex 3a formed on the inner-cabin side surface of the body panel 3 holds the hollow seal member 12 down from the upper side as shown in FIG. 17. The resultant cross-sectional shape of the hollow seal member 12 as bent is different from the cross-sectional shape of the hollow seal member 12 as bent when the side door 1 makes elastic contact with the body panel 3 as shown in FIG. 16, thereby remaining a problem that sealing property is not stabilized.

Also, there has remained another problem that the top end of the seal lip 13 is dragged toward the inner-cabin side and turned over depending on a direction in which the top end of the seal lip 13 extends, a direction in which an outer-cabin side surface of the body panel 3 with which the seal lip 13 makes elastic contact extends and entering direction of the body panel 3 from the upper side in case of supposing that the body panel 3 opens and closes like the roof door. As a result, sealing function is degraded.

Accordingly, sufficient sealing property has not been secured by simply applying the weather strip 10 mounted on the side door 1 between the side door 1 which opens and closes in the right and left directions (widthwise direction) and the roof door which opens and closes in the upward and downward directions.

Securing the sufficient sealing property is more difficult because of unevenness in closure positions of the side door 1 and the roof door as closed.

Automobiles according to Japanese unexamined Patent Publication No. S63-176721 include a seal structure in which side glasses on the side doors of sash-less structure directly make elastic contact with weather strips set up on side ends of roof doors (roof hatches). Such a structure has remained a problem that securing rigidity of the door around heads of crews is difficult.

In addition, throwing-down amount on the weather strip side of the side glasses which make elastic contact with the weather strips is generally great. Therefore, when the roof doors (roof hatches) are closed after the side doors are closed with the side glasses risen (closed), a risk increases that the weather strips interfere with the side glasses and seal parts formed on the weather strips are dragged.

When the seal parts are dragged, an expected sealing function is not sufficiently performed. Accordingly, the roof door (roof hatches) sides have to be closed first.

As mentioned above, there have not been proposed the seal structures for doors of automobiles capable of prior closing or posterior closing of either of the doors, the roof doors for example, while sufficiently securing sealing property between the side doors and the roof doors (roof hatches). It is to be noted that the Japanese unexamined Patent Publication No. S62-91316 does not disclose a seal structure between the side doors and the roof doors. Also, the Japanese unexamined Patent Publication No. S63-176721 relates to a drainage structure for T-bar roof vehicles or the like, of which both side parts on the automobile body roofs are removable roof hatches, and does not disclose the prior closing or posterior closing of either of the doors.

Therefore, an object of the present invention is to provide the seal structures for doors of automobiles in which the weather strips provided between the side doors which open and close in the right and left directions (widthwise direction of the automobile) and the roof doors which open and close in the upward and downward direction stabilize sealing property between the doors while simply securing rigidity of the doors.

SUMMARY OF THE INVENTION

In order to achieve the above-mentioned object, according to one aspect of the invention, a seal structure for a door of an automobile is provided, in which a door opening for a side door (21) has a roof opening for a roof door (23) successively provided on an upper side thereof, said side door (21) opening and closing in the widthwise direction of the automobile and a side end in the widthwise direction of said roof door (23) opening and closing in upward and downward directions via a hinge mechanism (24) provided around a center in a widthwise direction of the automobile, wherein:

said seal structure comprises a door weather strip (30) mounted on said side door (21), said door weather strip (30) making elastic contact with said roof door (23) for sealing a space between said side door (21) and the roof door (23) when the doors (21, 23) are closed;

said door weather strip (30) comprises: an installation base member (31) mounted on an outer peripheral upper end of a door sash (22) of said side door (21); and a main seal (32) swelled and curved toward an upper side from an inner-cabin side of said installation base member (31), said main seal (32) making elastic contact with an inner-cabin side surface (23X) on a side end of said roof door (23) when said doors (21, 23) are closed; and a tangent (140) on a contact part (80) on which said main seal (32) first touches said roof door (23) is a straight line which divides an angle (θ2) on an acute angle side between an advancing locus (110) of said side door (21) and an advancing locus (120) of said roof door (23) into a substantially half angle (θ1), said two advancing loci intersecting on said contact part (80).

In addition, according to an aspect of the invention, a seal structure for a door of an automobile is provided, wherein: said seal structure comprises:

a body side weather strip (40) successively provided along peripheral edges of said door opening and said roof opening, including parts from a front pillar (5) over a header (6), said body side weather strip (40) making elastic contact with said side door (21) and said roof door (23) when said side door (21) and said roof door (23) are closed; and a supporting member (70) of a die molded article comprising: an installation base member (71) mounted outside a vertical surface (6a) formed on a rear end of said header (6), said installation base member (71) extending in the widthwise direction of the automobile; and a fin-like thin vertical piece (72) extending toward a rear side of the automobile from an outer side end of said installation base member (71), a lower end (72a) of said vertical piece (72) being connected with said body side weather strip (40), said supporting member (70) controlling a position of said roof door (23) by receiving a front end corner (23S) of the roof door (23) in a concave (73) formed on a corner part encircled by an innercabin side surface of the vertical piece (72) and said installation base member (71) when said roof door (23) is closed.

In addition, according to an aspect of the invention, a seal structure for a door of an automobile is provided, wherein: said door weather strip (30) makes close elastic contact with an outer-cabin side surface of said vertical piece (72).

In addition, according to an aspect of the invention, a seal structure for a door of an automobile is provided, wherein: a rear side (72b) on the lower end (72a) of the vertical piece (72) of said supporting member (70) extends toward an inner-cabin side from an outercabin side relative to an upper surface of said body side weather strip (40) for closely shutting a space between the vertical piece (72) of said supporting member (70) and said roof door (23) when said roof door (23) is closed.

In addition, according to an aspect of the invention, a seal structure for a door of an automobile is provided, wherein: a convex (23a) is formed between the inner-cabin side surface (23X) and an outer-cabin side surface (23Y) of the side end of said roof door (23), the convex (23a) protruding toward said main seal (32) side when said doors (21, 23) are closed; and the inner-cabin side surface (23X) of the side end of said roof door (23) is a concave (23b) formed in succession to said convex (23a) toward the innercabin side, said main seal (32) making elastic contact with said inner-cabin side surface (23X).

In addition, according to an aspect of the invention, a seal structure for a door of an automobile is provided, wherein:

said seal structure comprises a seal lip (33) having a substantially tongue shape in cross-section, said seal lip (33) being provided in a manner to protrude toward an upper side from the outercabin side of said installation base member (31) and making elastic contact with the outercabin side surface (23Y) of the side end of said roof door (23) when said doors (21, 23) are closed; and a tangent (130) on a lip contact part (90) on which a top end (33a) of said seal lip (33) first touches said roof door (23) is within an angle (θ3(=θ2)) on an acute angle side between an advancing locus (110'(=110)) of said side door (21) and an advancing locus (120'(=120)) of said roof door (23), said two advancing loci intersecting on said lip contact part (90).

Symbols in parentheses show constituents or items corresponding to the drawings.

According to the seal structure for a door of an automobile of the present invention, the main seal of the weather strip mounted on the side door which opens and closes in the right and left directions makes elastic contact with the roof door which opens and closes in the upward and downward directions for sealing the space between the two doors. In the structure, the tangent on the contact part on which the main seal first touches the roof door is the straight line which divides the angle on the acute angle side between the advancing locus of the side door and the advancing locus of the roof door into the substantially half angle, the two advancing loci intersecting on the contact part. Accordingly, in case the side door is closed first and the roof door is closed second or in case the roof door is closed first and the side door is closed second on the contrary, cross-sectional shape of the main seal as bent is substantially the same, thereby performing stable sealing function.

The seal structure for a door of an automobile provides unprecedented doors of automobile capable of prior closing or posterior closing of either of the side door and the roof door while sufficiently securing the sealing property between the side door and the roof door.

In addition, according to the present invention, the die-molded supporting member is provided outside the vertical surface formed on the rear end of the header. The supporting member comprises: the installation base member extending in the widthwise direction of the automobile; and the fin-like thin vertical piece extending toward the rear side. Since the supporting member is die-molded, the supporting member is increased in rigidity. The supporting member controls the position of the roof door by receiving the front side corner of the roof door in the concave formed on the corner part encircled by the inner-cabin side surface of the vertical piece and the installation base member when the roof door is closed. Accordingly, the roof door is controlled to be on a predetermined certain position regardless of unevenness in a closure position on which the roof door is closed.

In addition, according to the present invention, since the door weather strip mounted on the side door also makes elastic contact with the outer-cabin side surface of the vertical piece of the supporting member, position of the door weather strip is also controlled.

In addition, the door weather strip is supported by the door sash of the side door and directly makes elastic contact with the side end of the roof door on which a sealing article is not provided. Such a structure prevents problems of the prior art that the side glass is thrown down toward the weather strip side on the side end of the roof door and interferes with the roof door or the seal part of the door weather strip is dragged, and therefore sealing property is degraded.

In case the side door is closed first and the roof door is closed second, the roof door directly abuts the door weather strip mounted on the door sash of the side door without touching other parts. On the contrary, in case the roof door is closed first and the side door is closed second, the door weather strip mounted on the door sash of the side door directly abuts the roof door without touching other parts. Such a structure provides unprecedented automobile doors, which do not matter an order of closing either of the side door and the roof door, while sufficiently securing the sealing property between the side door and the roof door.

In addition, the door sash having the door weather strip mounted thereon is positioned near crews' heads, not the side glass of the side door as in the prior art. Such a structure easily secures rigidity of the door.

In addition, according to the present invention, the rear side on the lower end of the vertical piece of the supporting member extends toward the inner-cabin side from the outer-cabin side relative to the upper surface of the body side weather strip for closely shutting the space between the vertical piece of the supporting member and the roof door when the roof door is closed. Such a structure prevents entrance of water toward the inner-cabin side from the outer-cabin side.

In addition, according to the present invention, when both doors are closed, the main seal makes elastic contact with the concave on the inner-cabin side surface formed on the side end of the roof door and bends. Such a structure performs sufficient sealing property. Even in case force acts in a direction of moving the side door toward the outer-cabin side while driving the automobile, the main seal is anchored by the convex successively provided on the outer-cabin side of the concave on the inner-cabin side surface of the roof door, thereby stabilizing the shape of the main seal as bent.

In addition, according to the present invention, the tangent on the lip contact part on which the top end of the seal lip first touches the roof door is within the angle on the acute angle side between the advancing locus of the side door and the advancing locus of the roof door, the two advancing loci intersecting on the lip contact part. Such a structure solves the problems according to the prior art that, especially in case the side door is closed first and the roof door is closed second, the roof door drags and turns over the top end of the seal lip toward the inner-cabin side, thereby degrading the sealing function.

DESCRIPTION OF PREFERRED EMBODIMENT

Figure 1:
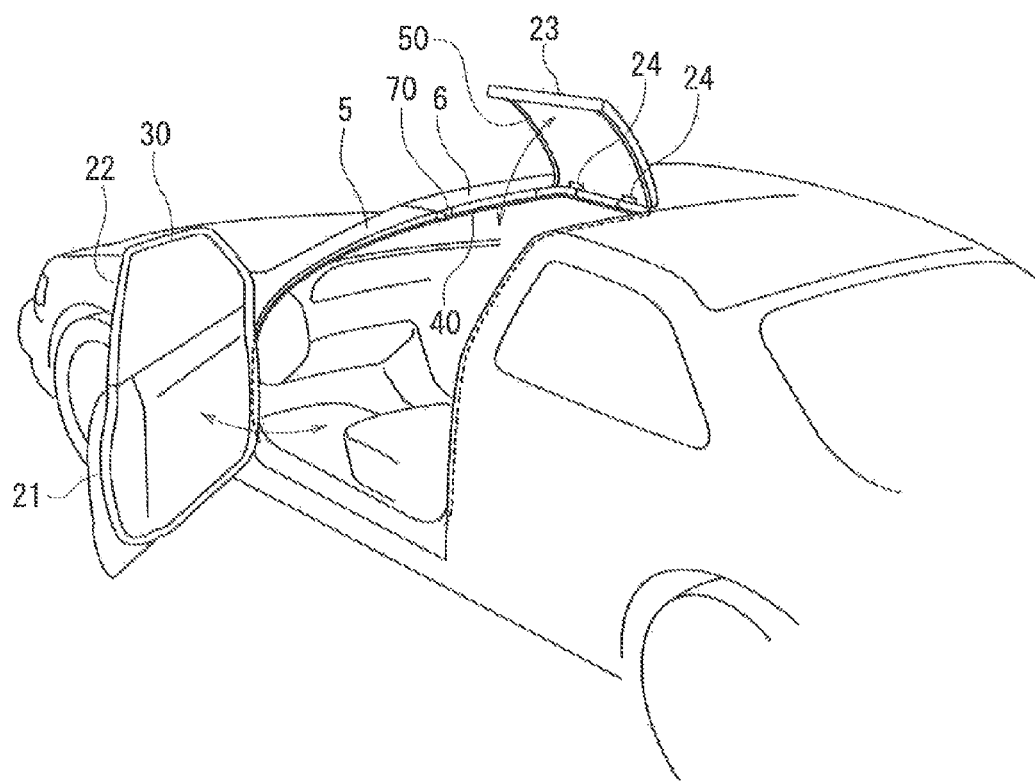
FIG. 1 is an external perspective view of an automobile employing seal structure for a door of an automobile according to an embodiment of the present invention.
Figure 2:
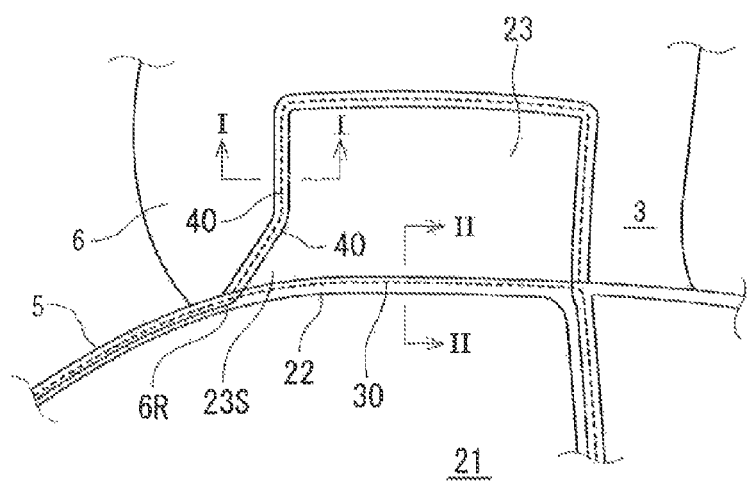
FIG. 2 is a perspective view of the seal structure for a door of an automobile of FIG. 1, showing a state that a side door and a roof door are closed.
Figure 3:
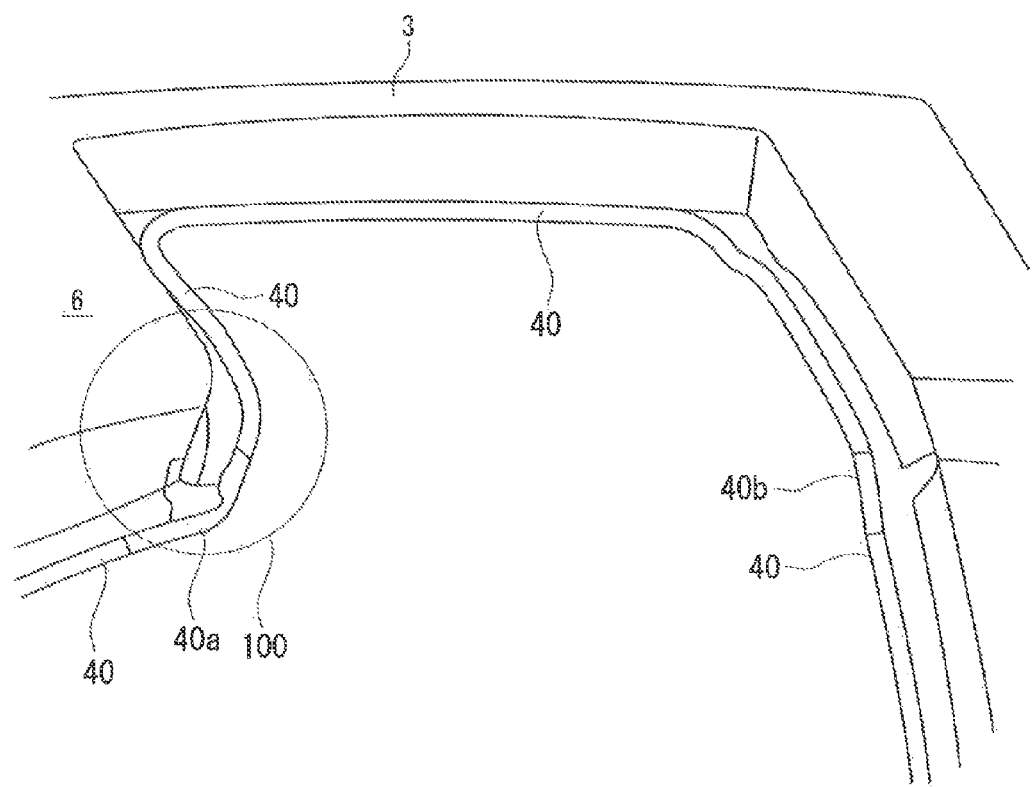
FIG. 3 is a perspective view of the seal structure for a door of an automobile of FIG. 1, showing an opening for a side door and an opening for a roof door on a body side.

Referring to FIG. 1 to FIG. 12, a seal structure for a door of an automobile according to an embodiment of the present invention will be described. FIG. 1 and FIG. 2 show external appearances of an automobile employing the seal structure for a door of an automobile according to the embodiment of the present invention, of which FIG. 1 shows a state that a side door and a roof door are open and FIG. 2 shows a state that the side door and the roof door are closed. FIG. 3 showing a door opening on a body side omits the roof door.

The seal structure for a door of an automobile according to the embodiment of the present invention is applicable to automobiles as shown in FIG. 1 in which a door opening for a side door 21 with a sash has a roof opening for a roof door 23 successively provided on an upper side thereof for enlarging an opening for getting in the automobile. The side door 21 with the sash opens and closes in a widthwise direction of the automobile via a hinge mechanism which is provided on a front side but not shown. A side end of the roof door 23 opens and closes in upward and downward directions via a hinge mechanism 24 provided around a center in the widthwise direction of the automobile.

As shown in FIG. 1, a body side weather strip 40 is successively provided along peripheral edges of the door opening for the side door 21 and the roof opening for the roof door 23 on a body panel 3 side.

Figure 4:
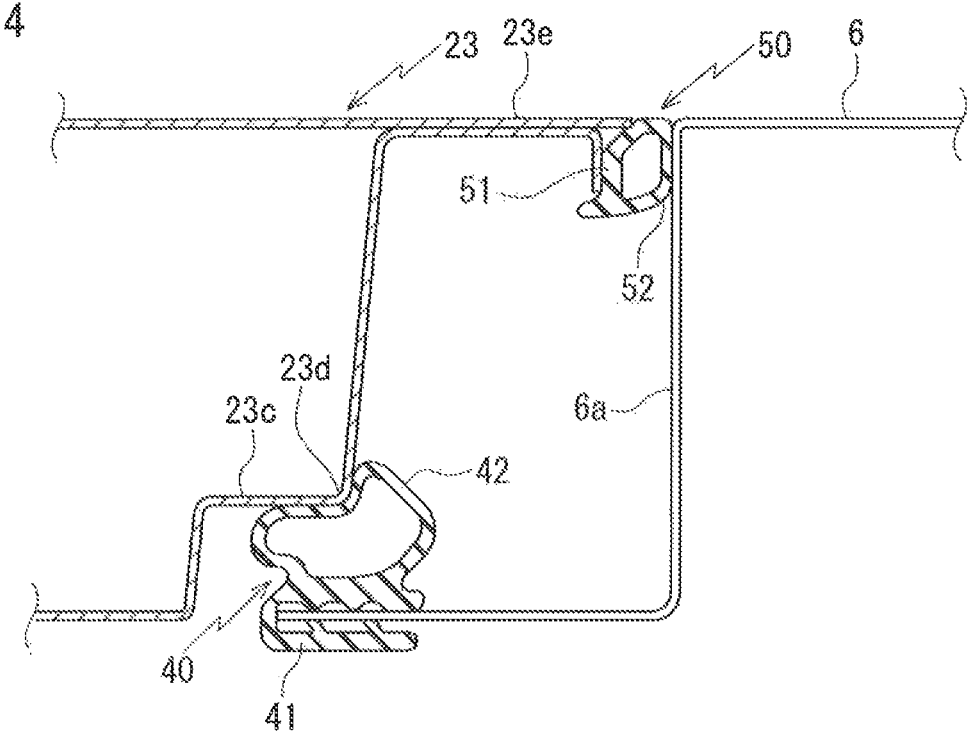
FIG. 4 is a I-I line enlarged cross section of FIG. 2.

As shown in FIG. 2 to FIG. 4, on an upper part of the automobile compared with a belt line, the body side weather strip 40 comprising an installation base member 41 and a hollow seal member integrally molded with the installation base member 41 is successively provided from a lower side of a front pillar 5 over a lower side on a rear end of a header 6, a lower side of the opening for the roof door 23 (roof opening) on a body 3 side relative to the roof door 23 and an inner-cabin side on a rear side of the opening for the side door. The installation base member 41 has a shape of grip which bypasses and fits on a flange. But the body side weather strip 40 may also be fixed on the panel by inserting adhesive tape on a contact surface of the hollow seal member 42 with the panel without providing the grip. When the side door 21 is closed, the hollow seal member 42 of the body side weather strip 40 makes elastic contact with the inner-cabin side (part 22a blocked up in a bag shape (FIG. 5, FIG. 11)) of the door sash 22 of the side door 21. When the roof door 23 is closed, the hollow seal member 42 makes elastic contact with a corner 23d (FIG. 4) on a step portion 23c provided on a lower side of the roof door 23 (the belt line is a boundary line between the glass and the panel of the side door).

As shown in FIG. 3, on a part 40a on a corner curving toward a rear end of the header 6 from the front pillar 5, with which an upper front side corner of the door sash 22 of the side door 21 makes elastic contact, an extrusion molded part of the body side weather strip 40 with which the side door 21 makes elastic contact and an extrusion molded part of the body side weather strip 40 with which the roof door 23 makes elastic contact are connected by die molding. Also, the body side weather strip 40 is connected by die molding on a part 40b with which an upper rear side corner of the door sash 22 of the side door 21 makes elastic contact.

Figure 5:
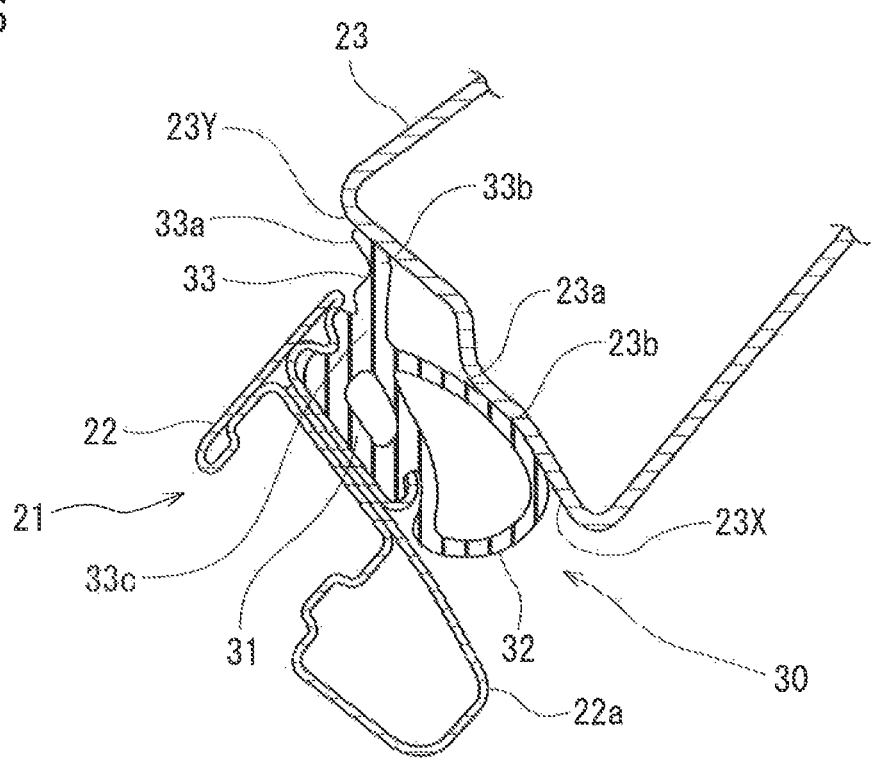
FIG. 5 is a II-II line enlarged cross section of FIG. 2.

In addition, as shown in FIG. 1, FIG. 2 and FIG. 5, the side door 21 has a door weather strip 30 mounted on the inner-cabin side thereof.

The door weather strip 30 mainly comprises seal parts such as an installation base member 31, a hollow seal member 32 integrally molded with an inner-cabin side of the installation base member 31 and a seal lip 33 integrally molded with an outer-cabin side of the installation base member 31.

On the door sash 22 of the side door 21, the installation base member 31 is mounted on an outer peripheral upper end of the door sash 22 along a direction in which the door sash 22 extends.

The hollow seal member 32 is swelled and curved toward an upper side from an inner-cabin side of the installation base member 31, that is toward a roof door 23 side. When the doors 21, 23 are closed, the hollow seal member 32 makes elastic contact with an inner-cabin side surface 23X of the side end of the roof door 23 for sealing a space between the doors 21, 23.

The seal lip 33 having a substantially tongue shape in cross-section is provided in a manner to protrude toward an upper side from the outer-cabin side of the installation base member 31 and makes elastic contact with an outer-cabin side surface 23Y of the side end of the roof door 23 for sealing the space between the doors 21, 23 together with the hollow seal member 32 when the doors 21, 23 are closed. In addition, a direction in which a top end 33a of the seal lip 33 extends is inclined toward the outer-cabin side in cross section in a widthwise direction of the automobile relative to a direction in which the seal lip 33 extends from a base root 33c. Accordingly, as shown in FIG. 5, when the doors 21, 23 are closed, a back surface side of a top end 33a of the seal lip 33, that is an interval between the top end 33a of the seal lip 33 as a surface which comes into contact with the side end of the roof door 23 and the base root 33b of the top end 33a, makes elastic contact with the outer-cabin side surface 23Y of the side end of the roof door 23.

In addition, as shown in FIG. 2, when the side door 21 is closed, on a front side of the side door 21, the hollow seal member 32 and the seal lip 33 make elastic contact with a side surface of the front pillar 5 over an upper side of a side surface 6R of a header 6 for sealing an inside and an outside of the automobile, while on a rear side of the side door 21, the hollow seal member 32 and the seal lip 33 make elastic contact with an outer-cabin side on the rear side of an opening for the side door 21 for sealing the inside and the outside of the automobile.

The roof door 23 can be opened manually or automatically from the inner-cabin side. As shown in FIG. 1, FIG. 2 and FIG. 4, a parting seal 50 is mounted successively along a front end, a rear end and a side end on a hinge mechanism 24 side connecting the front end and the rear end of the roof door 23, thereby forming a substantially U-shape.

Figure 10:
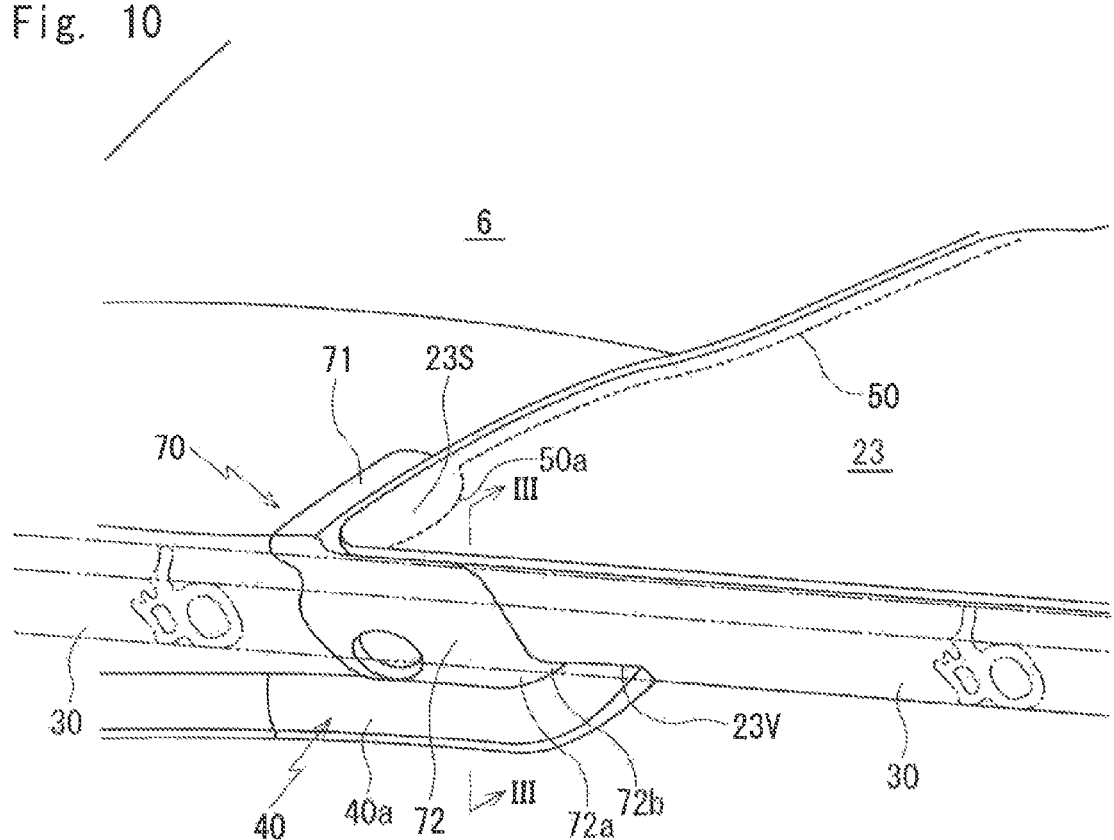
FIG. 10 is an enlarged perspective view of an important part 100 of FIG. 3 in a state that the roof door is closed.

As shown in FIG. 4, the parting seal 50 comprises: an installation base member 51 mounted on a top end of a flange 23e protruding toward an outer side in a front and rear direction of the automobile from peripheral edge of an upper surface of the roof door 23; and a hollow seal member 52 integrally molded with the installation base member 51. When the roof door 23 is closed, the hollow seal member 52 of the parting seal 50 makes elastic contact with an upper side of the opening for the roof door 23 (roof opening). Especially, on the front end of the roof door 23, the hollow seal member 52 makes elastic contact with a vertical surface 6a formed on the rear end of the header 6 for sealing a space between the roof door 23 and the header 6. As shown in FIG. 10, an end on a parting seal 50 side, which makes elastic contact with a rear end of the header 6 is a terminal die molded part 50a which is die molded.

The roof door 23 has the innercabin side surface 23X and an outer-cabin side surface 23Y respectively provided on the inner-cabin side and the outer-cabin side of the side end thereof with a step between the inner-cabin side surface 23X and an outercabin side surface 23Y. The door weather strip 30 makes elastic contact with the side end of the roof door 23. The inner-cabin side surface 23X and the outer-cabin side surface 23Y extend toward the inner-cabin side from the outer-cabin side when the roof door is closed. The outer-cabin side surface 23Y is further spaced out from the facing the door weather strip 30 compared with the inner-cabin side surface 23X by the step. Also, a convex 23a is formed between the inner-cabin side surface 23X and the outer-cabin side surface 23Y, more specifically on the outer-cabin side of the inner-cabin side surface 23X. The convex 23a protrudes toward the door weather strip 30 side (door sash 22 side, hollow seal member 32 side to be described later) when the doors 21, 23 are closed. Further, a concave 23b is successively formed on the inner-cabin side of the convex 23a.

Material of the roof door 23 is not especially limited. In the present embodiment, the roof door 23 is made of fiber-reinforced plastic.

Figure 7:
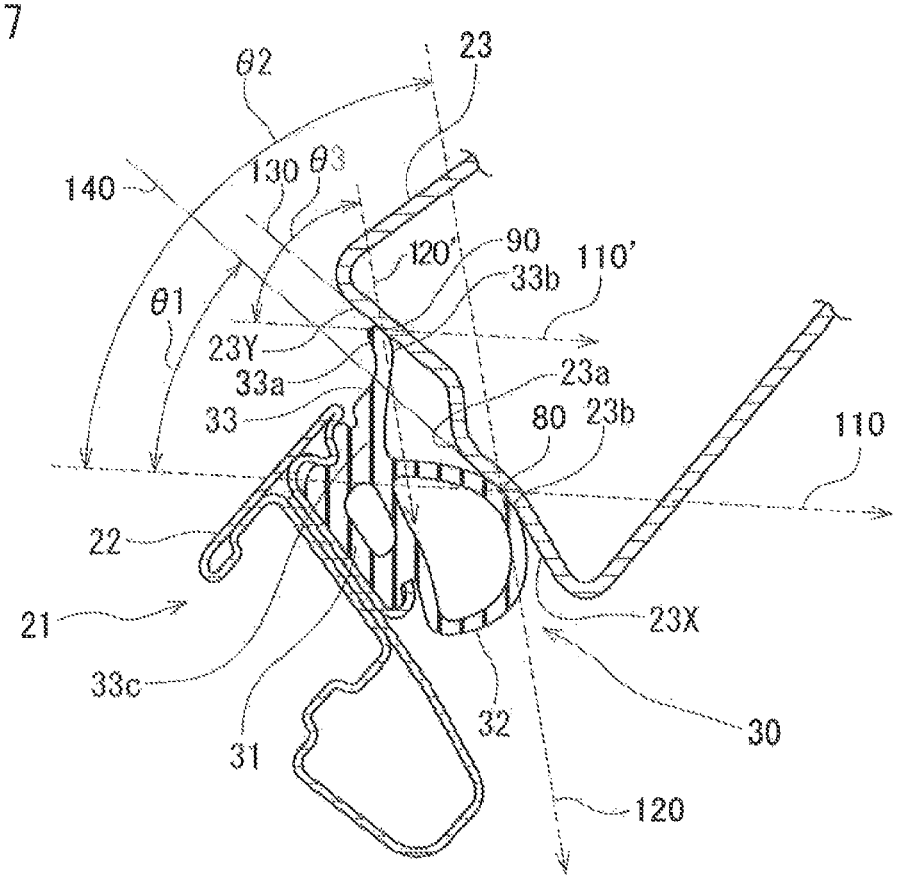
FIG. 7 is a cross section showing a state that the roof door shown in FIG. 6 first abuts the side door in a process of descending and being closed.
Figure 8:
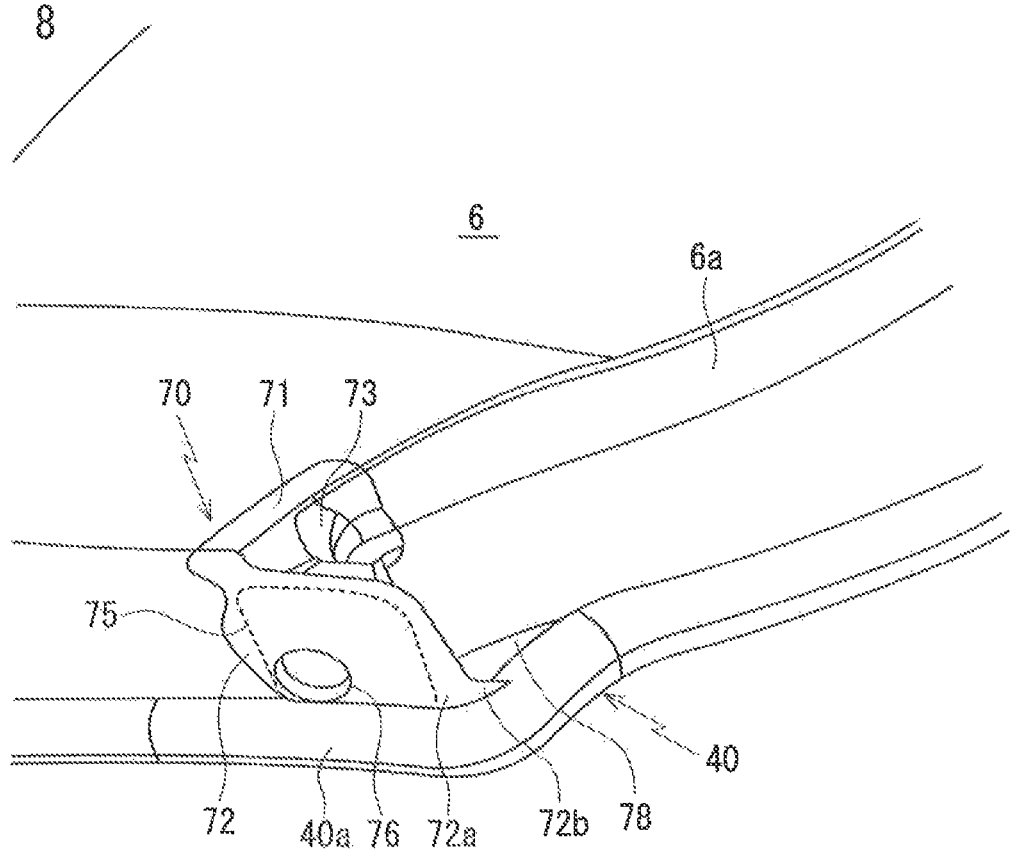
FIG. 8 is an enlarged perspective view of an important part 100 of FIG. 3.

As shown in FIG. 7, a tangent 140 on a contact part 80 on which the hollow seal member 32 in cross section first touches the roof door 23 relative to the roof door 23 is a straight line which divides an angle θ2 on an acute angle side between an advancing locus 110 of the side door 21 and an advancing locus 120 of the roof door 23 into a substantially half angle θ1, the two advancing loci intersecting on the contact part 80.

Also, as shown in FIG. 7, a tangent 130 on a lip contact part 90 on which a top end 33a of the seal lip 33 in cross section first touches the roof door 23 relative to the roof door 23 is within an angle θ3(=θ2) on an acute angle side between an advancing locus 110'(=110) of the side door 21 and an advancing locus 120'(=120) of the roof door 23, the two advancing loci intersecting on the lip contact part 90.

In the present embodiment, the tangent 130 accords with the straight line which divides the angle θ3 into the substantially half angle, that is the tangent 130 is substantially in parallel with the tangent 140. But the tangent 130 may be on any position within the angle θ3 on the acute angle side. Accordingly, the tangent 130 may be on the advancing locus 110' side of the side door 21 or the advancing locus 120' side of the roof door 23 compared with the straight line which divides the angle θ3 into the substantially half angle.

Figure 6:
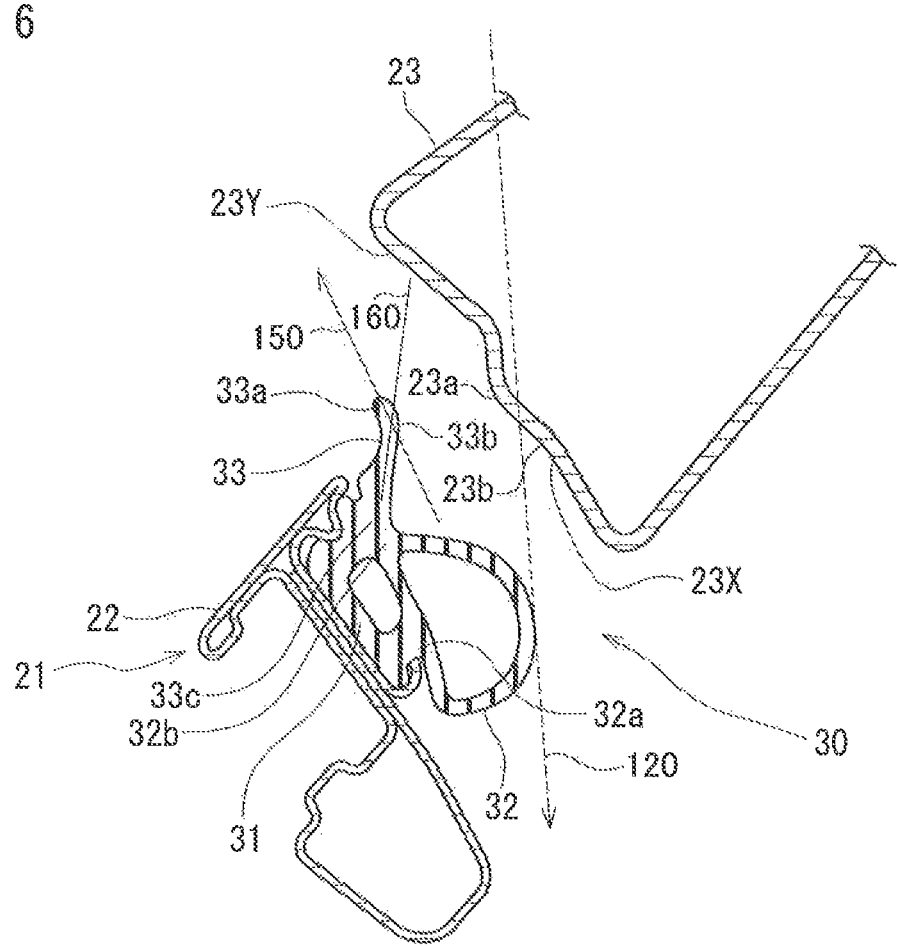
FIG. 6 is a cross section showing a state that a roof door is opened relative to a closed side door shown in FIG. 5.

In addition, as shown in FIG. 6, a direction 150 in which a top end 33a of the seal lip 33 extends is inclined toward the outer-cabin side in cross section relative to a direction 160 in which the seal lip 33 extends from a base root 33c. Accordingly, when the doors 21, 23 are closed, a back surface side of the top end 33a of the seal lip 33 as a surface which comes into contact with the side end of the roof door 23 makes elastic contact with the outer-cabin side surface 23Y of the roof door 23.

Figure 15:
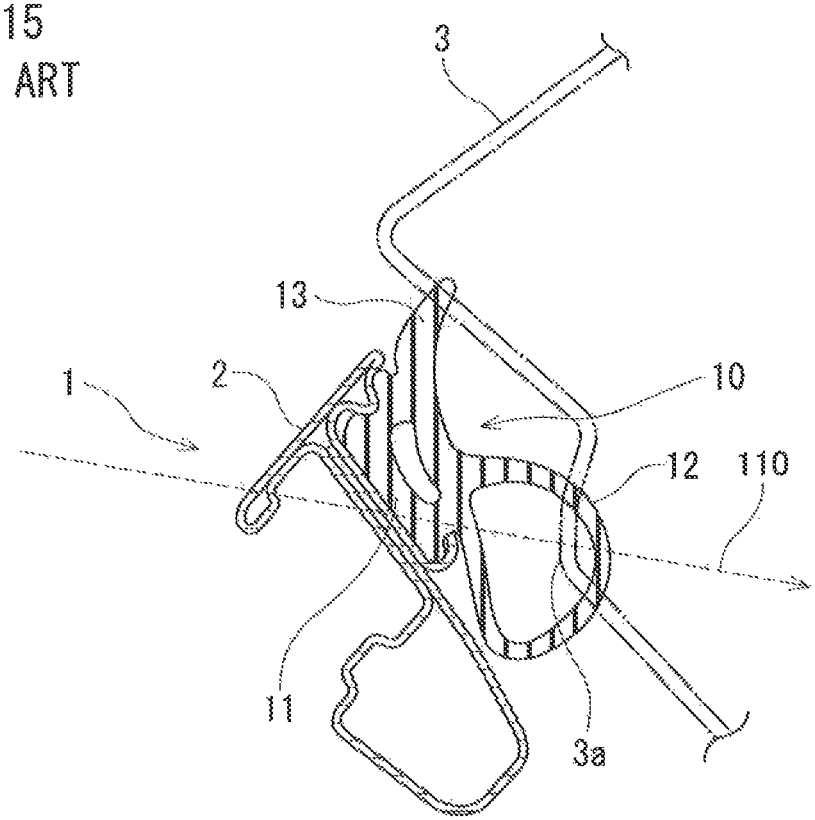
FIG. 15 is a cross section showing a seal structure for a door of an automobile according to a prior art.
Figure 16:
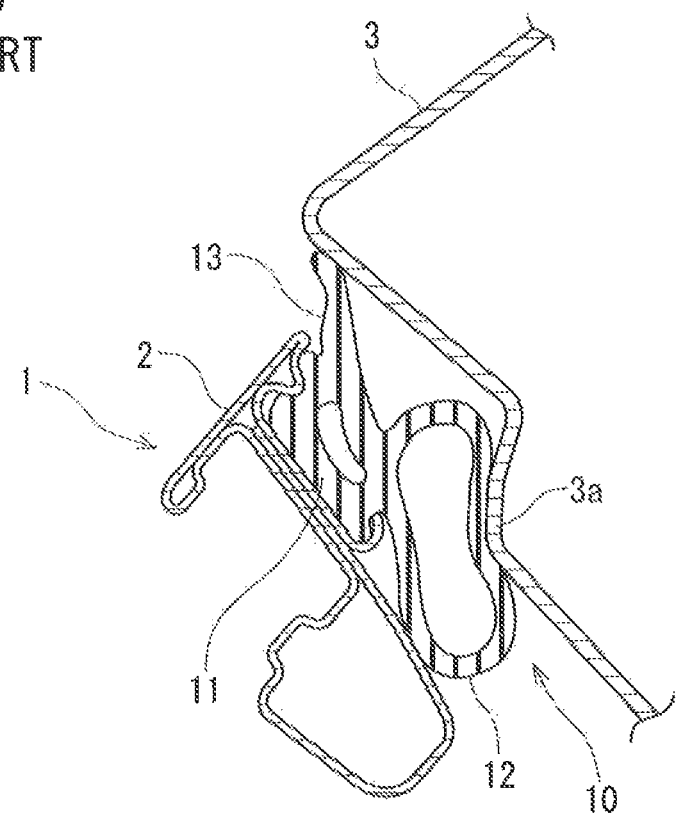
FIG. 16 is a cross section showing a state that the side door shown in FIG. 15 is closed and makes elastic contact with a body.

As to the hollow seal member 32 and the seal lip 33, the base root 33c of the seal lip 33 is connected with the base root 32b on the outer-cabin side of the hollow seal member 32, not separate from each other as in the prior art (FIG. 15).

As shown in FIGS. 8 to 11, a supporting member 70 is provided on an outside (outer-cabin side) of a rear end of the header 6 (left side in a widthwise direction of the automobile in the present embodiment) for supporting and controlling positions of the side door 21 and the roof door 23. FIGS. 8 to 11 show an important part 100 circled in FIG. 3.

The supporting member 70 comprises: an installation base member 71 mounted on an outside (outer-cabin side) of a vertical surface 6a formed on a rear end of the header 6; and a fin-like thin vertical piece 72 extending toward a rear side of the automobile from an outer side end in a widthwise direction of the installation base member 71.

The supporting member 70 is a die molded article connected with a die molded part 40a of the body side weather strip 40 arranged on a corner which curves toward a rear end of a side surface 6R of the header 6 from the front pillar 5 by integral die molding. Accordingly, the supporting member 70 having moderate elasticity is increased in rigidity compared with an extrusion molded part (part other than die molded part) of the body side weather strip 40. As shown in FIGS. 8 to 11, the vertical piece 72 has a plane core 75 embedded therein. The vertical piece 72 having the plane core 75 embedded therein is fixed on a step 6b of the header 6 via a clip (not shown) inserted from a clip hole 76.

A lower end 72a of the vertical piece 72 of the supporting member 70 is connected with an upper surface of the body side weather strip 40. Especially, a rear side 72b of the lower end 72a of the vertical piece 72 is connected with the body side weather strip 40 while taperingly extending toward the inner-cabin side from the outer-cabin side relative to an upper surface (around top) of the hollow seal member 42 of the body side weather strip 40.

A concave 73 is formed on a corner part encircled by an inner-cabin side surface of the vertical piece 72 and the installation base member 71. The concave 73 receives a convex 23T which protrudes toward a lower side from a lower surface of a front end corner 23S of the roof door 23 when the roof door 23 is closed. The concave 73 has a conical shape tapered toward the lower side from the opening for receiving the convex 23T in a certain position thereof.

Figure 11:
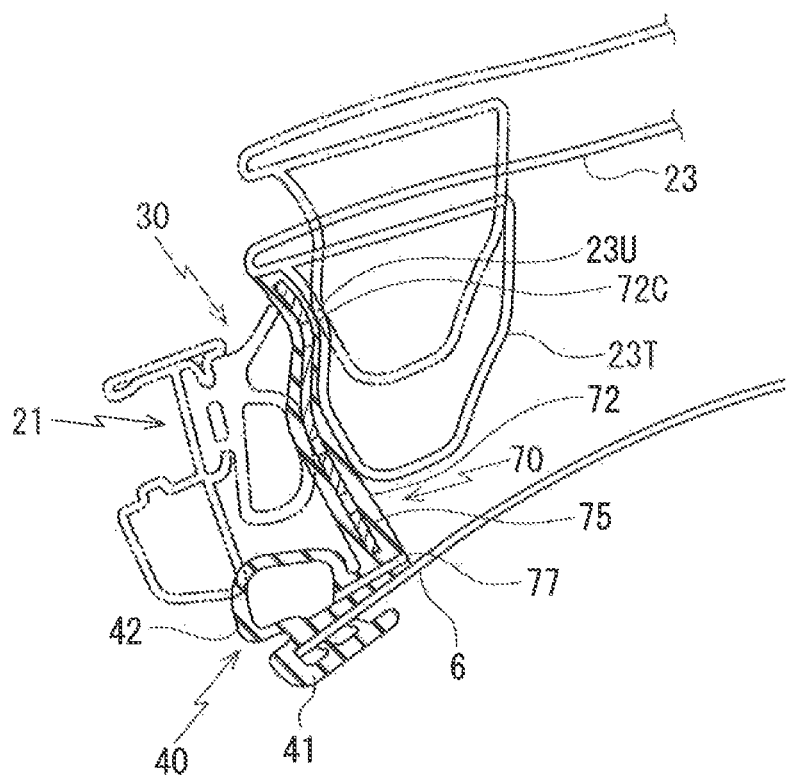
FIG. 11 is a III-III line enlarged cross section of FIG. 10.

As shown in FIG. 11, the vertical piece 72 has a protrusion 72c formed on an upper side thereof, which curves to protrude toward the inner-cabin side from the outer-cabin side for receiving the outer-cabin side of the convex 23T provided on the lower surface of the roof door 23 when the roof door 23 is closed. More specifically, the convex 23T of the roof door 23 has a concave 23U formed on an outer-cabin side thereof. The concave 23U has a shape corresponding to a curved shape of the protrusion 72c of the vertical piece 72. When the roof door 23 is closed, the concave 23U of the roof door 23 abuts the protrusion 72c of the vertical piece 72 from the upper side, both curved surfaces are slidably brought into smooth contact with each other and the convex 23T fits with the concave 73.

Figure 9:
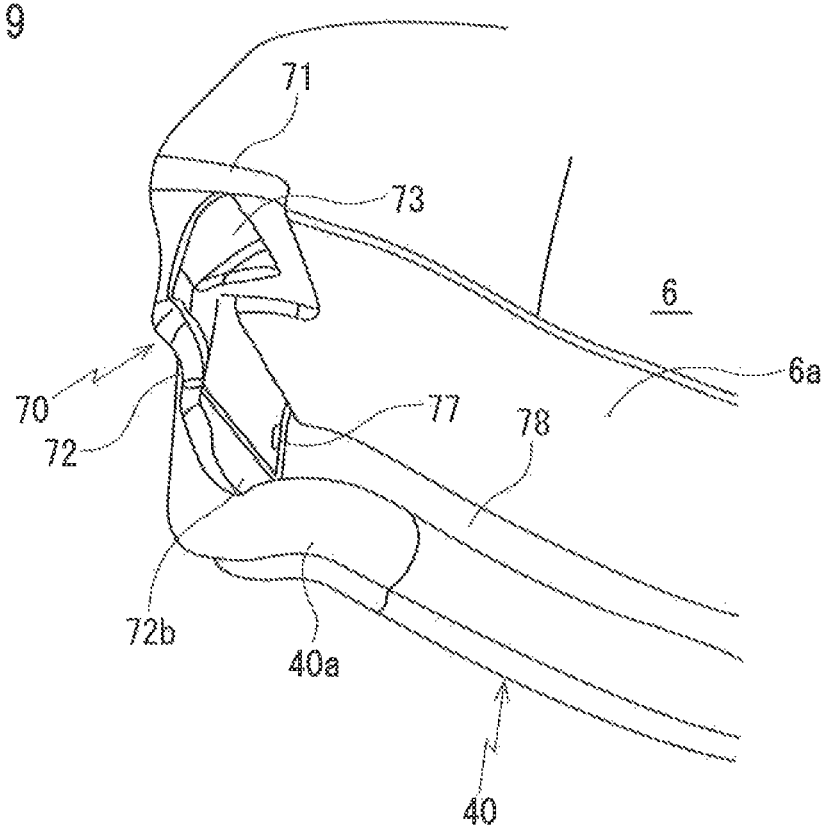
FIG. 9 is an enlarged perspective view of an important part 100 of FIG. 3 seen from a different angle from FIG. 8.

As shown in FIGS. 9 and 11, a drainage hole 77 is formed on a lower side of the inner-cabin side surface of the vertical piece 72 of the supporting member 70. The drainage hole 77 communicates with an inside of the hollow seal member 42 of the die molded part 40a which is integrally die molded of the body side weather strip 40. Water which enters a space between the header 6 and the roof door 23 is guided inside the hollow seal member 42 via a roof side gutter 78 and the drainage hole 77, fallen down and drained outside the automobile. Also, an aperture may be provided between the header 6 and the vertical piece 72 for draining water from a gutter provided on the front pillar 5 without forming the drainage hole 77.

As shown in FIG. 10, a terminal die molded part 50a which is die molded on an end of the parting seal 50 makes elastic contact with a surface of the installation base member 71 of the supporting member 70 when the roof door 23 is closed. The parting seal 50 is provided on a front end of the roof door 23 and makes elastic contact with a rear end of the header 6.

As shown in FIG. 11, the hollow seal member 32 and the seal lip 33 of the door weather strip 30 make elastic contact with the outer-cabin side surface of the vertical piece 72 of the supporting member 70 for positioning when the side door 21 is closed. The door weather strip 30' makes close elastic contact with the side end of the roof door 23 and the outer-cabin side surface of the vertical piece 72.

Figure 12:
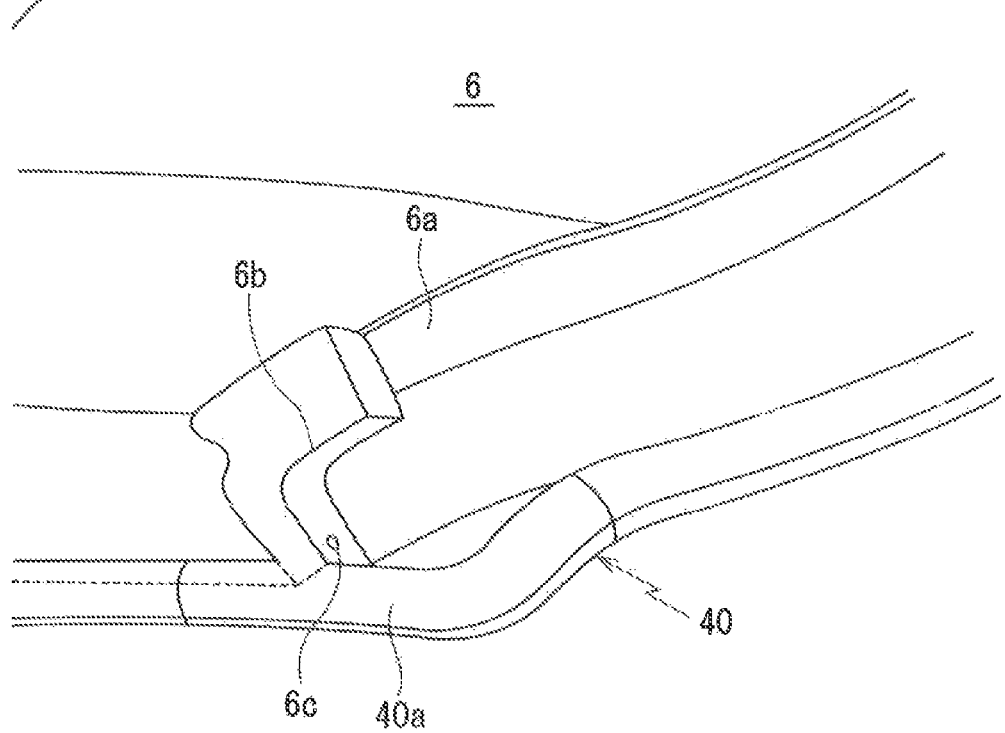
FIG. 12 is an enlarged perspective view showing a part on which a supporting member shown in FIG. 8 is to be mounted.

As shown in FIG. 12, a step 6b extending in a front and rear direction is formed on the vertical surface 6a of the header 6, on which the installation base member 71 of the supporting member 70 is mounted. When the installation base member 71 of the supporting member 70 is mounted, the vertical surface 6a of the header 6 is flush with the installation base member 71. The step 6b has an installation hole 6c formed thereon for fitting a top end of a clip therein (not shown) inserted from a clip hole 76 formed on the supporting member 70.

According to the seal structure for a door of an automobile, when the roof door 23 is closed, the concave 73 of the supporting member 70 receives the convex 23T formed on the front end corner 23S of the roof door 23 as shown in FIG. 10 while the concave 23U on the outer-cabin side of the convex 23T of the roof door 23 abuts the protrusion 72c of the vertical piece 72, both curved surfaces are slidably brought into smooth contact with each other and the convex 23T fits with the concave 73. Accordingly, the roof door 23 is controlled to be on a predetermined certain position regardless of unevenness in a closure position of the roof door 23 as closed.

The hollow seal member 32 and the seal lip 33 of the door weather strip 30 mounted on the door sash 22 of the side door 21 make elastic contact with the outercabin side surface of the vertical piece 72 of the supporting member 70, thereby controlling the position of the door weather strip 30.

Accordingly, as shown in FIG. 7, in case the side door 21 is closed first and the roof door 23 is closed second, the concave 23b on the inner-cabin side surface 23X of the side end of the roof door 23 directly abuts the hollow seal member 32 without touching any part other than the hollow seal member 32 while the outer-cabin side surface 23Y of the side end of the roof door 23 directly abuts the seal lip 33 without touching any part other than the seal lip 33.

Figure 17:
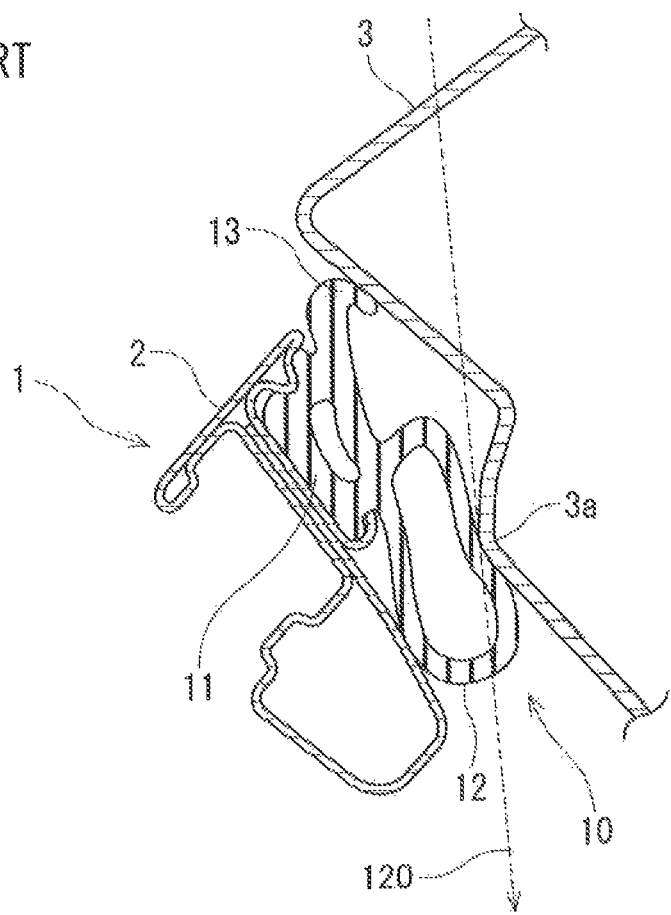
FIG. 17 is a cross section showing a relation between the hollow seal member mounted of the side door and a body, shown in FIG. 15 at a time of elastic contact.

In addition, in a completely closed state after the roof door 23 is closed, as shown in FIG. 5, the hollow seal member 32 makes elastic contact around the concave 23b of the inner-cabin side surface 23X formed on the side end of the roof door 23 and bends. Such a structure performs sufficient sealing property. Even in case force acts in a direction of moving the side door 21 toward the outer-cabin side while driving the automobile, the hollow seal member 32 is anchored by the convex 23a successively provided on the outer-cabin side of the concave 23b on the inner-cabin side surface 23X, thereby stabilizing the shape of the hollow seal member 32 as bent. Also, the top end 33a of the seal lip 33 curves toward the outer-cabin side from the base root 33b of the top end without being dragged toward the inner-cabin side as in the prior art (FIG. 17), thereby achieving sufficient sealing performance.

On the contrary, in case the roof door 23 is closed first and the side door 21 is closed second, as shown in FIG. 7, the hollow seal member 32 directly abuts the concave 23b on the inner-cabin side surface 23X of the side end of the roof door 23 without touching any part other than the concave 23b while the seal lip 33 directly abuts the outer-cabin side surface 23Y of the side end of the roof door 23 without touching any part other than the outer-cabin side surface 23Y.

In addition, in a completely closed state after the side door 21 is closed, as shown in FIG. 5, the hollow seal member 32 makes elastic contact around the concave 23b on the inner-cabin side surface 23X formed on the side end of the roof door 23 and bends. Such a structure performs sufficient sealing property. Even in case force acts in the direction of moving the side door 21 toward the outer-cabin side while driving the automobile, the hollow seal member 32 is anchored by the convex 23a successively provided on the outer-cabin side of the concave 23b on the inner-cabin side surface 23X, thereby stabilizing the shape of the hollow seal member 32 as bent. Also, the top end 33a of the seal lip 33 curves toward the outer-cabin side from the base root 33b of the top end without being dragged toward the inner-cabin side as in the prior art (FIG. 17), thereby achieving sufficient sealing performance.

In the present embodiment, when the doors 21, 23 are closed, the seal lip 33 makes elastic contact with the side end of the roof door 23 simultaneously with the hollow seal member 32. But the seal lip 33 may make elastic contact with the side end of the roof door 23 prior to the hollow seal member 32. Such a structure further prevents the top end 33a of the seal lip 33 from being dragged toward the inner-cabin side.

In addition, the rear side 72b of the lower end 72a of the supporting member 70 is connected with the body side weather strip 40 while taperingly extending toward the inner-cabin side from the outer-cabin side relative to the upper surface (around top) of the body side weather strip 40. Accordingly, when the roof door 23 is closed, a space between the lower end 72a of the vertical piece 72 of the supporting member 70 and the roof door 23 is closely shut.

As shown in FIG. 10, thickness of the roof door 23 is thinned on a front side compared with a part 23V of the roof door 23 facing the body side weather strip 40 and the upper part of the body side weather strip 40 is stored in the thinned part 23V for further improving sealability. But the thickness may be substantially uniform without forming the thinned part 23V.

As mentioned above, according to the seal structure for a door of an automobile of the present embodiment, the tangent 140 on the contact part 80 on which the hollow seal member 32 first touches the roof door 23 is the straight line which divides the angle θ2 on the acute angle side between the advancing locus 110 of the side door 21 and the advancing locus 120 of the roof door 23 into the substantially half angle θ1, the two advancing loci intersecting on the contact part 80. Accordingly, in case the side door 21 is closed first and the roof door 23 is closed second or in case the roof door 23 is closed first and the side door 21 is closed second on the contrary, the shape of the hollow seal member 32 as bent is substantially the same in cross section. As a result, the stable sealing function is performed without degrading the sealing property and the stable seal structure for a door of an automobile is provided.

In addition, in case the side door 21 is closed first and the roof door 23 is closed second, the inner-cabin side surface 23X and the outer-cabin side surface 23Y of the side end of the roof door 23 directly abut the hollow seal member 32 and the seal lip 33 respectively without abutting other parts whereas in case the roof door 23 is closed first and the side door 21 is closed second, the hollow seal member 32 and the seal lip 33 directly abut the inner-cabin side surface 23X and the outercabin side surface 23Y of the side end of the roof door 23 respectively without abutting other parts. Such a structure does not unnecessarily deform the shape of the hollow seal member 32.

In addition, as to the seal lip 33, the tangent 130 on the lip contact part 90 on which the top end 33a of the seal lip 33 first touches the roof door 23 is within the angle θ3(=θ2) on the acute angle side between the advancing locus 110' of the side door 21 and the advancing locus 120' of the roof door 23, the two advancing loci intersecting on the lip contact part 90. Such a structure solves the problems according to the prior art that, especially in case the side door 21 is closed first and the roof door 23 is closed second, the roof door 23 drags the top end 33a of the seal lip 33 toward the inner-cabin side and turns over the top end 33a, thereby degrading the sealing function.

In addition, the door weather strip 30 is supported by the door sash 22 of the side door 21 and directly makes elastic contact with the side end of the roof door 23. Such a structure differs from the structure according to the prior art that the side glass is thrown down toward the weather strip side on the side end of the roof door. In addition, the door sash 22, not the side glass of the side door 21, is positioned near crews' heads. Such a structure easily secures rigidity of the door.

In addition, the base root 33c of the seal lip 33 is connected with the base root 32b on the outer-cabin side of the hollow seal member 32 which functions as the main seal. Such a structure prevents twist between the hollow seal member 32 and the seal lip 33.

The seal lip 33 and the hollow seal member 32 of the door weather strip 30, which are positioned nearby with each other, make elastic contact with the roof door 23 while sandwiching the convex 23a on the inner-cabin side surface of the roof door 23. Such a structure prevents swerve in an elastic contact position.

In addition, when the doors 21, 23 are closed, the seal lip 33 makes elastic contact with the side end of the roof door 23 prior to the main seal 32 or simultaneously with the main seal 32. Such a structure further prevents the top end 33a of the seal lip 33 from being dragged toward the inner-cabin side by the roof door 23.

In addition, the direction 150 in which the top end 33a of the seal lip 33 extends is inclined toward the outer-cabin side relative to the direction 160 in which the seal lip 33 extends from the base root 33c. Accordingly, the back surface side of the seal lip 33 as the surface which comes into contact with the side end of the roof door 23 makes elastic contact with the roof door 23. Therefore, when the seal lip 33 makes elastic contact with the roof door 23, the seal lip 33 bends in a manner to curve toward the outercabin side, thereby decreasing the risk that the seal lip 33 is dragged toward the inner-cabin side by the roof door 23.

In addition, the rear side 72b of the lower end 72a of the vertical piece 72 is connected with the body side weather strip 40 while taperingly extending toward the upper surface of the hollow seal member 42 of the body side weather strip 40. Such a structure prevents entrance of water and improves an external appearance.

In addition, the vertical piece 72 of the supporting member has the plane core 75 embedded therein. Such a structure increases rigidity and further stably controls positions of the roof door 23 and the side door 21.

In addition, the step 6b is formed on the vertical surface 6a of the header 6 on which the installation base member 71 of the supporting member 70 is mounted. When the installation base member 71 of the supporting member 70 is mounted, the vertical surface 6a of the header 6 is flush with the installation base member 71. Accordingly when the roof door 23 is closed, the roof door 23 can be positioned to approach the header 6, thereby minimizing a parting interval between the roof door 23 and the header 6.

The parting seal 50 is mounted on the front end of the roof door 23 for sealing the space between the roof door 23 and the header 6. When the roof door 23 is closed, the terminal die molded part 50a of the parting seal 50 makes elastic contact with the installation base member 71 of the supporting member 70, thereby improving the sealing property between the roof door 23 and the header 6.

Water which enters the space between the header 6 and the roof door 23 is drained from the drainage hole 77 via the roof side gutter 78. Such a structure prevents entrance of water toward the inner-cabin side.

Figure 13:
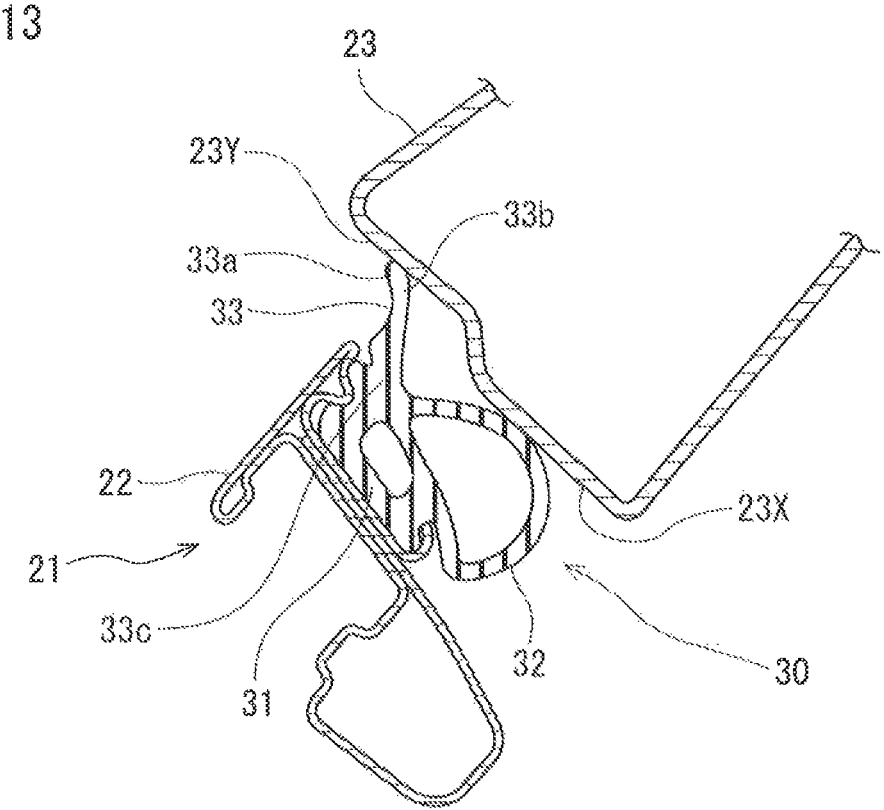
FIG. 13 is a II-II line enlarged cross section of FIG. 2, showing a variation of the roof door shown in FIG. 1.
Figure 14:
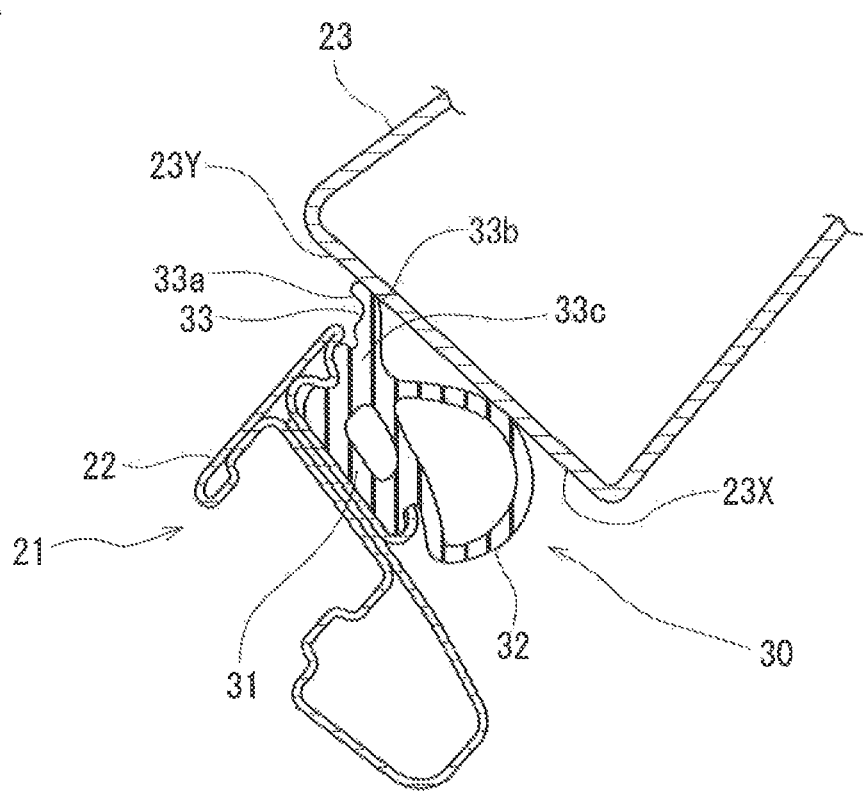
FIG. 14 is a II-II line enlarged cross section of FIG. 2, showing another variation of the roof door shown in FIG. 1.

According to the seal structure for a door of an automobile of the embodiment of the present invention, the convex 23a and the concave 23b are formed on the inner-cabin side surface 23X of the side end of the rood door 23 for positioning the hollow seal member 32. But, as shown in FIG. 13, the inner-cabin side surface 23X can be level or, as shown in FIG. 14, the inner-cabin side surface 23X and the outer-cabin side surface 23Y can be flush without a step therebetween.

The seal structure for a door of an automobile according to the embodiment of the present invention is applicable to one of or both of a driver's seat side and a passenger's seat side on a front seat side. The side door is not limited to the one which opens and closes by the hinge mechanism described in the present embodiment and may be a sliding type side door which opens and closes in a sliding manner.

We claim:

1. A seal structure for a door of an automobile in which a door opening for a side door has a roof opening for a roof door successively provided on an upper side thereof said side door opening and closing in the widthwise direction of the automobile and a side end in the widthwise direction of said roof door opening and closing in upward and downward directions via a hinge mechanism provided around a center in a widthwise direction of the automobile, wherein:

said seal structure comprises a door weather strip mounted on said side door, said door weather strip making elastic contact with said roof door for sealing a space between said side door and the roof door when the doors are closed;

said door weather strip comprises: an installation base member mounted on an outer peripheral upper end of a door sash of said side door; and a main seal swelled and curved toward an upper side from an inner-cabin side of said installation base member, said main seal making elastic contact with an inner-cabin side surface of a side end of said roof door when said doors are closed; and said main seal having a contact part defined by a portion which first contacts the roof door, said roof door having a contact part defined by the portion which first contacts the main seal, a tangent on the intersection of said contact parts comprises a straight line which divides an acute angle between a line defined by a track of movement of said contact part of said door weather strip of said side door and a line defined by a track of movement of said contact part of said roof door into a substantially half angle, said two lines intersecting at said intersection.

2. The seal structure for a door of an automobile as claimed in claim 1, wherein: said seal structure comprises: a body side weather strip successively provided along peripheral edges of said door opening and said roof opening, including parts from a front pillar over a header, said body side weather strip making elastic contact with said side door and said roof door when said side door and said roof door are closed; and a supporting member of a die molded article comprising: an installation base member mounted outside a vertical surface formed on a rear end of said header, said installation base member extending in the widthwise direction of the automobile; and a fin-like thin vertical piece extending toward a rear side of the automobile from an outer side end of said installation base member, a lower end of said vertical piece being connected with said body side weather strip, said supporting member controlling a position of said roof door by receiving a front side corner of the roof door in a concave formed on a corner part encircled by an inner-cabin side surface of the vertical piece and said installation base member when said roof door is closed.

3. The seal structure for a door of an automobile as claimed in claim 2, wherein: said door weather strip makes close elastic contact with an outer-cabin side surface of said vertical piece.

4. The seal structure for a door of an automobile as claimed in claim 2, wherein: a rear side of the lower end of the vertical piece of said supporting member extends toward an inner-cabin side from an outer-cabin side relative to an upper surface of said body side weather strip for closely shutting a space between the vertical piece of said supporting member and said roof door when said roof door is closed.

5. The seal structure for a door of an automobile as claimed in claim 1, wherein: a convex is formed between the inner-cabin side surface and an outer-cabin side surface of the side end of said roof door, the convex protruding toward said main seal side when said doors are closed; and the inner-cabin side surface of the side end of said roof door is a concave formed in succession to said convex toward the inner-cabin side, said main seal making elastic contact with said inner-cabin side surface.

6. The seal structure for a door of an automobile as claimed in claim 1, wherein: said seal structure comprises a seal lip having a substantially tongue shape in cross-section, said seal lip being provided in a manner to protrude toward an upper side from the outer-cabin side of said installation base member and making elastic contact with the outercabin side surface of the side end of said roof door when said doors are closed; and a tangent on a lip contact part on which a top end of said seal lip first touches said roof door is within an angle on an acute angle side between an advancing locus of said side door and an advancing locus of said roof door, said two advancing loci intersecting on said lip contact part.

7. The seal structure for a door of an automobile as claimed in claim 3, wherein: a rear side of the lower end of the vertical piece of said supporting member extends toward an inner-cabin side from an outer-cabin side relative to an upper surface of said body side weather strip for closely shutting a space between the vertical piece of said supporting member and said roof door when said roof door is closed.

8. The seal structure for a door of an automobile as claimed in claim 2, wherein: a convex is formed between the inner-cabin side surface and an outer-cabin side surface of the side end of said roof door, the convex protruding toward said main seal side when said doors are closed; and the inner-cabin side surface of the side end of said roof door is a concave formed in succession to said convex toward the inner-cabin side, said main seal making elastic contact with said inner-cabin side surface.

9. The seal structure for a door of an automobile as claimed in claim 3, wherein: a convex is formed between the inner-cabin side surface and an outer-cabin side surface of the side end of said roof door, the convex protruding toward said main seal side when said doors are closed; and the inner-cabin side surface of the side end of said roof door is a concave formed in succession to said convex toward the inner-cabin side, said main seal making elastic contact with said inner-cabin side surface.

10. The seal structure for a door of an automobile as claimed in claim 4, wherein: a convex is formed between the inner-cabin side surface and an outer-cabin side surface of the side end of said roof door, the convex protruding toward said main seal side when said doors are closed; and the inner-cabin side surface of the side end of said roof door is a concave formed in succession to said convex toward the inner-cabin side, said main seal making elastic contact with said inner-cabin side surface.

11. The seal structure for a door of an automobile as claimed in claim 7, wherein: a convex is formed between the inner-cabin side surface and an outer-cabin side surface of the side end of said roof door, the convex protruding toward said main seal side when said doors are closed: and the inner-cabin side surface of the side end of said roof door is a concave formed in succession to said convex toward the inner-cabin side, said main seal making elastic contact with said inner-cabin side surface.

12. The seal structure for a door of an automobile as claimed in claim 2, wherein: said seal structure comprises a seal lip having a substantially tongue shape in cross-section, said seal lip being provided in a manner to protrude toward an upper side from the outer-cabin side of said installation base member and making elastic contact with the outer-cabin side surface of the side end of said roof door when said doors are closed; and a tangent on a lip contact part on which a top end of said seal lip first touches said roof door is within an angle on an acute angle side between an advancing locus of said side door and an advancing locus of said roof door, said two advancing loci intersecting on said lip contact part.

13. The seal structure for a door of an automobile as claimed in claim 3, wherein: said seal structure comprises a seal lip having a substantially tongue shape in cross-section, said seal lip being provided in a manner to protrude toward an upper side from the outer-cabin side of said installation base member and making elastic contact with the outer-cabin side surface of the side end of said roof door when said doors are closed; and a tangent on a lip contact part on which a top end of said seal lip first touches said roof door is within an angle on an acute angle side between an advancing locus of said side door and an advancing locus of said roof door, said two advancing loci intersecting on said lip contact part.

14. The seal structure for a door of an automobile as claimed in claim 4, wherein: said seal structure comprises a seal lip having a substantially tongue shape in cross-section, said seal lip being provided in a manner to protrude toward an upper side from the outer-cabin side of said installation base member and making elastic contact with the outer-cabin side surface of the side end of said roof door when said doors are closed; and a tangent on a lip contact part on which a top end of said seal lip first touches said roof door is within an angle on an acute angle side between an advancing locus of said side door and an advancing locus of said roof door, said two advancing loci intersecting on said lip contact part.

15. The seal structure for a door of an automobile as claimed in claim 7, wherein: said seal structure comprises a seal lip having a substantially tongue shape in cross-section, said seal lip being provided in a manner to protrude toward an upper side from the outer-cabin side of said installation base member and making elastic contact with the outer-cabin side surface of the side end of said roof door when said doors are closed; and a tangent on a lip contact part on which a top end of said seal lip first touches said roof door is within an angle on an acute angle side between an advancing locus of said side door and an advancing locus of said roof door, said two advancing loci intersecting on said lip contact part.

16. The seal structure for a door of an automobile as claimed in claim 5, wherein: said seal structure comprises a seal lip having a substantially tongue shape in cross-section, said seal lip being provided in a manner to protrude toward an upper side from the outer-cabin side of said installation base member and making elastic contact with the outer-cabin side surface of the side end of said roof door when said doors are closed; and a tangent on a lip contact part on which a top end of said seal lip first touches said roof door is within an angle on an acute angle side between an advancing locus of said side door and an advancing locus of said roof door, said two advancing loci intersecting on said lip contact part.

17. The seal structure for a door of an automobile as claimed in claim 8, wherein: said seal structure comprises a seal lip having a substantially tongue shape in cross-section, said seal lip being provided in a manner to protrude toward an upper side from the outer-cabin side of said installation base member and making elastic contact with the outer-cabin side surface of the side end of said roof door when said doors are closed; and a tangent on a lip contact part on which a top end of said seal lip first touches said roof door is within an angle on an acute angle side between an advancing locus of said side door and an advancing locus of said roof door, said two advancing loci intersecting on said lip contact part.

18. The seal structure for a door of an automobile as claimed in claim 9, wherein: said seal structure comprises a seal lip having a substantially tongue shape in cross-section, said seal lip being provided in a manner to protrude toward an upper side from the outer-cabin side of said installation base member and making elastic contact with the outer-cabin side surface of the side end of said roof door when said doors are closed; and a tangent on a lip contact part on which a top end of said seal lip first touches said roof door is within an angle on an acute angle side between an advancing locus of said side door and an advancing locus of said roof door, said two advancing loci intersecting on said lip contact part.

19. The seal structure for a door of an automobile as claimed in claim 10, wherein: said seal structure comprises a seal lip having a substantially tongue shape in cross-section, said seal lip being provided in a manner to protrude toward an upper side from the outer-cabin side of said installation base member and making elastic contact with the outer-cabin side surface of the side end of said roof door when said doors are closed; and a tangent on a lip contact part on which a top end of said seal lip first touches said roof door is within an angle on an acute angle side between an advancing locus of said side door and an advancing locus of said roof door, said two advancing loci intersecting on said lip contact part.

20. The seal structure for a door of an automobile as claimed in claim 11, wherein: said seal structure comprises a seal lip having a substantially tongue shape in cross-section, said seal lip being provided in a manner to protrude toward an upper side from the outer-cabin side of said installation base member and making elastic contact with the outer-cabin side surface of the side end of said roof door when said doors are closed; and a tangent on a lip contact part on which a top end of said seal lip first touches said roof door is within an angle on an acute angle side between an advancing locus of said side door and an advancing locus of said roof door, said two advancing loci intersecting on said lip contact part.

* * * * *